United States Patent [19]

Inoue

[11] Patent Number: 4,473,733

[45] Date of Patent: Sep. 25, 1984

[54] EDM METHOD AND APPARATUS USING HYDROCARBON AND WATER LIQUIDS

[75] Inventor: Kiyoshi Inoue, Tokyo, Japan

[73] Assignee: Inoue-Japax Research Incorporated, Yokohama, Japan

[21] Appl. No.: 394,509

[22] Filed: Jul. 2, 1982

[30] Foreign Application Priority Data

Jul. 7, 1981 [JP] Japan ............................. 56-106584
Nov. 4, 1981 [JP] Japan ............................. 56-177651

[51] Int. Cl.³ ......................... B23P 1/08; B23P 1/16
[52] U.S. Cl. ............................. 219/69 P; 219/69 D; 219/69 W; 219/69 M
[58] Field of Search ............. 219/69 D, 69 M, 69 W, 219/69 V, 69 E, 69 P; 204/129.5, 129.6

[56] References Cited

U.S. PATENT DOCUMENTS

| | | | |
|---|---|---|---|
| 2,906,853 | 9/1959 | Sibley | 219/69 W |
| 2,996,602 | 8/1961 | Webb | 219/69 D |
| 3,144,540 | 8/1964 | Haas | 219/69 D |
| 3,385,947 | 5/1968 | Inoue | 219/69 M |
| 3,454,737 | 7/1969 | Pfau et al. | 219/69 D |
| 3,472,993 | 10/1969 | Gromov et al. | 219/69 D |
| 3,814,892 | 6/1974 | Inoue | 219/69 E |
| 3,878,352 | 4/1975 | Inoue | 219/69 D |
| 3,909,577 | 9/1975 | Houman | 219/69 D |
| 4,134,807 | 1/1979 | Briffod | 219/69 M |
| 4,205,213 | 5/1980 | Inoue | 219/69 W |
| 4,263,493 | 4/1981 | Kilcher | 219/69 W |
| 4,317,019 | 2/1982 | Itoh | 219/69 D |

FOREIGN PATENT DOCUMENTS

| | | | |
|---|---|---|---|
| 154898 | 12/1979 | Japan | 219/69 D |
| 637872 | 5/1950 | United Kingdom . | |
| 1033005 | 6/1966 | United Kingdom . | |
| 1076171 | 7/1967 | United Kingdom . | |
| 1136956 | 12/1968 | United Kingdom . | |
| 1452218 | 10/1976 | United Kingdom . | |
| 2009242 | 6/1979 | United Kingdom . | |
| 337223 | 5/1972 | U.S.S.R. | 219/69 D |

*Primary Examiner*—Roy N. Envall, Jr.
*Assistant Examiner*—Geoffrey S. Evans
*Attorney, Agent, or Firm*—Karl F. Ross; Herbert Dubno

[57] ABSTRACT

Electroerosion machining method and apparatus in which the machining gap formed between a tool electrode and a workpiece is immersed in a water liquid to surround and enclose the gap therewith in the absence of a hydrocarbon liquid surrounding the gap. The hydrocarbon liquid is injected in a forced flow under an external pressure into the machining gap immersed in, and surrounded by and enclosed with, that water liquid, whereupon electrical discharges are initiated with a discharge medium which is at least predominantly constituted with the injected hydrocarbon liquid. The water liquid may be of a relatively static mass retained in a worktank, in which mass the workpiece and at least that portion of the tool electrode which is juxtaposed therewith are immersed. The injected hydrocarbon liquid upon undergoing the electrical discharges is allowed to diffuse into the water liquid surrounding the gap to float onto the surface thereof. Alternatively, with the hydrocarbon liquid directed in at least one narrow stream selectively into the machining gap, the water liquid may be present to surround and enclose the machining gap by being directed in a flow toward the workpiece to serve as an envelope flow for the narrow stream of the hydrocarbon liquid which acts to force the water flow substantially not to enter the machining gap and then to force it to spread over a portion of the workpiece surrounding the machining gap. The tool electrode may be a continuous wire electrode.

20 Claims, 3 Drawing Figures

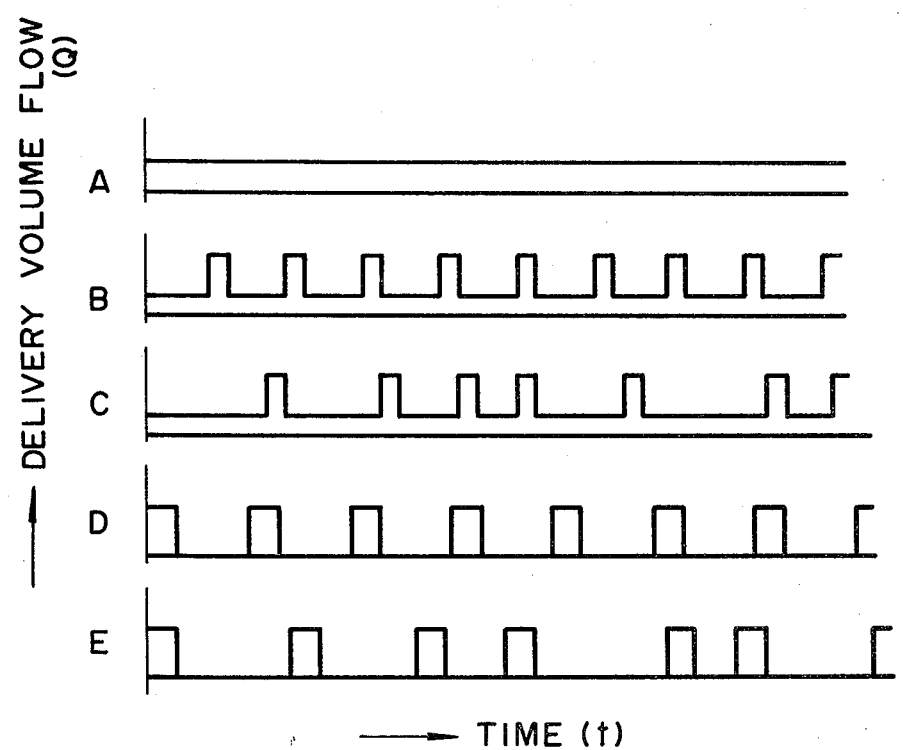

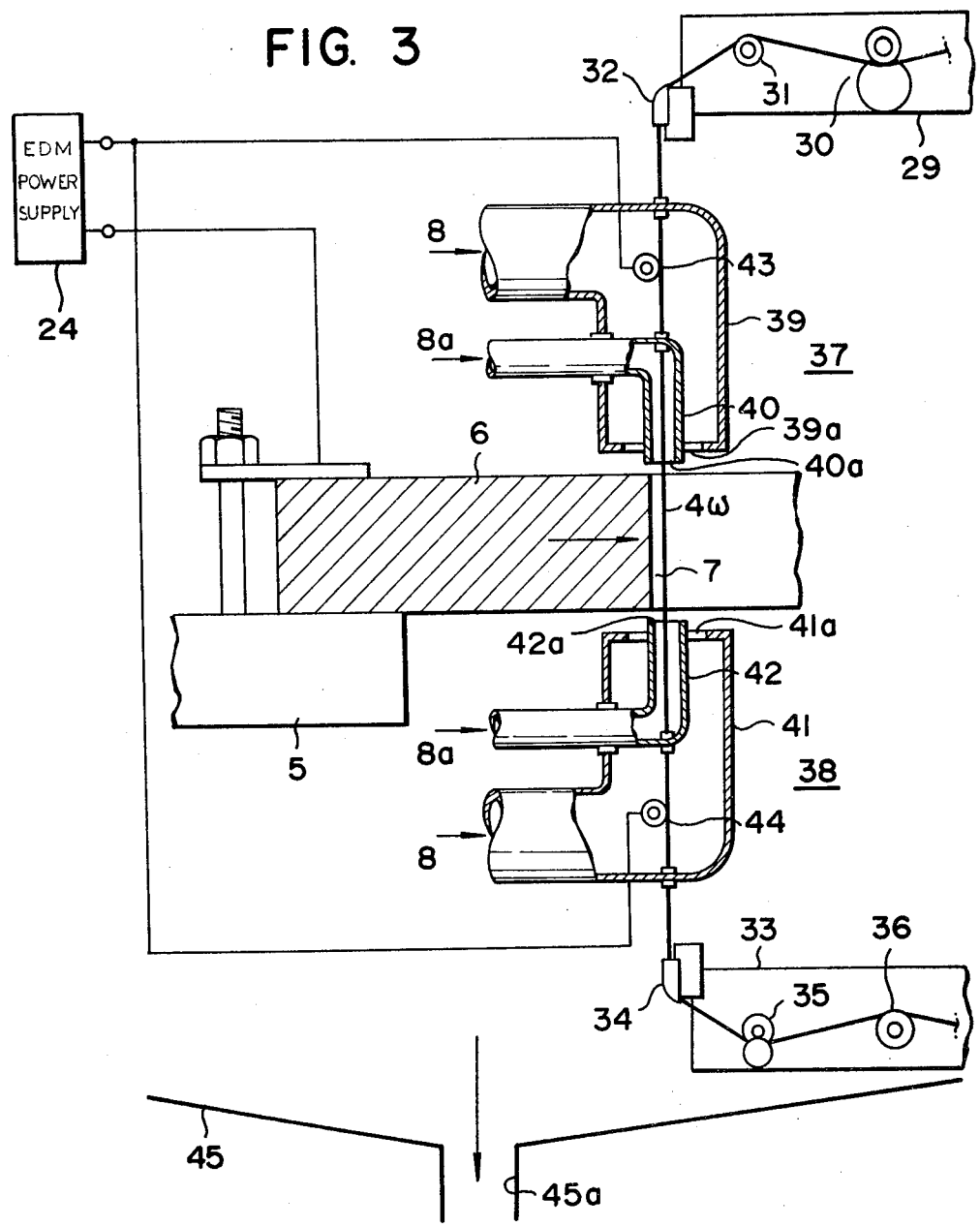

EDM METHOD AND APPARATUS USING HYDROCARBON AND WATER LIQUIDS

FIELD OF THE INVENTION

The present invention relates generally to the electrical-discharge-machining of a workpiece by supplying a machining liquid into a machining gap formed between a tool electrode and the workpiece while repetitively and intermittently applying a voltage pulse across the machining gap flooded with the machining liquid to produce a succession of electrical discharges between the tool electrode and the workpiece, thereby electro-erosively removing material from the latter. As material removal proceeds, the tool electrode and the workpiece are relatively displaced so as to continue development of such material-removal discharges until a desired extent of machining is achieved. The invention relates more particularly to an improved method of and apparatus for electrical discharge machining of the type described.

BACKGROUND OF THE INVENTION

Electrical discharge machining (EDM) processes are generally divided into two categories, sinking-type EDM and traveling-wire EDM. In the sinking-type EDM process, the tool electrode is a simple or formed solid electrode designed to form a cavity complementary in shape thereto in a workpiece. In this process, the workpiece is immersed in the machining liquid commonly constituted by a hydrocarbon liquid such as kerosene. A worktank is used to retain the hydrocarbon machining liquid and the workpiece is immersed therein and positioned sufficiently below the surface of this liquid in the worktank. The tool electrode is commonly formed with one or more fluid passages therein through which the machining liquid is supplied into the machining gap. Alternatively or in addition, one or more nozzles are disposed in the region of the tool electrode or the workpiece and used to direct the machining liquid into the machining gap. It has been recognized that this process entails a danger of fire because of the inflammability of the hydrocarbon liquid. When electrical discharges effected through the hydrocarbon liquid are exposed to air, fire tends to develop and may result in property damage. Furthermore, the hydrocarbon liquid upon decomposition by electrical discharges produces gases and mists and tends to pollute the environmental atmosphere. While the danger of fire may be alleviated by adding certain chemicals to the hydrocarbon liquid, this adds to cost and may result in a significant reduction in the machining efficiency.

In the traveling-wire EDM process, the tool electrode is a thin, continuous wire which is axially transported to continuously traverse the workpiece exposed to air. The machining gap formed between the traveling wire electrode and the workpiece need to be consecutively flushed with the machining liquid which, however, with the workpiece always exposed to air, can in no way be served by an inflammable hydrocarbon liquid as in the sinking-type EDM process. Thus, in the traveling-wire EDM process, it has been the common practice to employ a water liquid as the machining liquid.

With the traveling-wire process gaining increasing popularity, attempts have been made to apply a water liquid, which previously found its sole use in that process, to the sinking-type process. It has been found, however, that the water liquid when used in the sinking-type process fails to yield a mirror-finish machined surface as required in an ultra-fine machining range and further is unsuitable for use with "no-wear" or "low-wear" machining requirements. Moreover, it has been observed that with the tool machining area reduced, say, to less than several hundred square millimeters, the water machining liquid seldom offers the required machining stability and efficiency in the sinking-type process.

These deficiencies of the water liquid give rise to problems in the traveling-wire process as well. Thus, the cutting tends to be unstable for a thicker workpiece or with a thicker wire electrode. The result is a breakage of the wire electrode.

OBJECTS OF THE INVENTION

The present invention seeks to provide an improved EDM method, applicable to both the sinking-type and traveling-wire processes, which makes it possible to achieve a desired EDM operation without the danger of a fire and yet affording an excellent machining stability, quality and efficiency, and which method circumvents the respective disadvantages of a hydrocarbon liquid and a water liquid by using the two liquids in a novel manner.

The present invention also seeks to provide an improved EDM apparatus for carrying out the method described.

SUMMARY OF THE INVENTION

In accordance with the present invention there is provided, in a first aspect thereof, a method of machining a workpiece wherein a tool electrode is spacedly juxtaposed with the workpiece across a machining gap and a succession of electrical pulses are applied across the machining gap filled with a machining liquid to effect time-spaced electrical discharges between the tool electrode and the workpiece through the machining gap, which method comprises the steps of: (a) immersing and machining gap in a water liquid; (b) injecting a hydrocarbon liquid into said machining gap immersed in said water liquid; and (c) constituting said machining liquid at least predominantly with said hydrocarbon liquid.

Specifically, step (a) in the method described may, especially as applied to the sinking-type process, be achieved by immersing the workpiece and at least a portion of the tool electrode juxtaposed therewith in the water liquid retained in a worktank. In this manner, the hydrocarbon liquid injected into the machining gap and subjected to electrical discharges is allowed to diffuse into the water liquid surrounding the machining gap and then to float on the water liquid. Advantageously, the hydrocarbon liquid floating on the water liquid may be drawn under a suction and treated for recycling. The water liquid retained as a relatively static mass in the worktank may also be drained and treated for recycling.

The method for use with a traveling-wire EDM machine comprises, in step (b), directing at least one narrow stream of the hydrocarbon liquid selectivity into the machining gap and, in step (a), directing a flow of the water liquid towards the workpiece to serve as an envelope flow for the narrow stream and permitting the water liquid flow to be forced and deflected by the hydrocarbon stream so as substantially not to enter the machining gap and then to spread over a portion of the workpiece surrounding the machining gap. In this case, the tool electrode is a continuous wire electrode which is continuously transported axially to traverse the workpiece. The flow of the water liquid is projected from a first nozzle with an opening thereof adjacent to the workpiece and coaxial with the wire electrode traversing the workpiece. The narrow stream of the hydrocarbon liquid is projected from a second nozzle coaxial with and smaller in cross-section than the first nozzle and having an opening thereof closer to the workpiece than the opening of the first nozzle.

The invention provides, in a second aspect thereof, an apparatus for machining a workpiece by electroerosion, comprising: a tool electrode adapted to be spacedly juxtaposed with the workpiece across a machining gap; a power supply for applying a succession of electrical pulses across the machining gap filled with a machining liquid to effect time-spaced electrical discharges between the tool electrode and the workpiece through the machining gap; means for immersing said machining gap in a water liquid; and means (b) for injecting into the machining gap immersed in the water liquid a hydrocarbon liquid in the gap.

Specifically, the apparatus may, for use in the sinking-type process, comprise a worktank for receiving the water liquid and retaining the workpiece immersed therein together with at least a portion of the tool electrode spacedly juxtaposed with the workpiece to form the machining gap therewith.

Preferably, the apparatus further comprises a cover member adapted to be at least partly immersed in the water liquid in the worktank for collecting immediately therebelow the hydrocarbon liquid diffused into the water liquid from the machining gap and floating on the water liquid and suction means for drawing the collected hydrocarbon out of the cover member.

Additionally, the lateral surface of the tool electrode may be enclosed with a partition member for limiting entry of the water liquid into the machining gap. The partition member may be constituted by a porous body composed of a rubber or synthetic resin, or a metal or alloy coated with a synthetic resin or rubber. Advantageously, the partition member is composed at least in part of a permanent magnet so as to be capable of attachment to the ferrous workpiece by magnetic attraction.

BRIEF DESCRIPTION OF THE DRAWING

These and other features of the present invention as well as advantages thereof will become more readily apparent from a reading of the following description of certain preferred embodiments thereof when taken with reference to the accompanying diagrammatic drawing in which:

FIGS. 2(A)–2(E) are time charts illustrating various modes of delivering the hydrocarbon liquid into the machining gap in accordance with the present invention; and FIG. 3 is a side view partly in section illustrating an embodiment of the present invention as applied to a traveling-wire EDM process.

SPECIFIC DESCRIPTION

Figure 1:
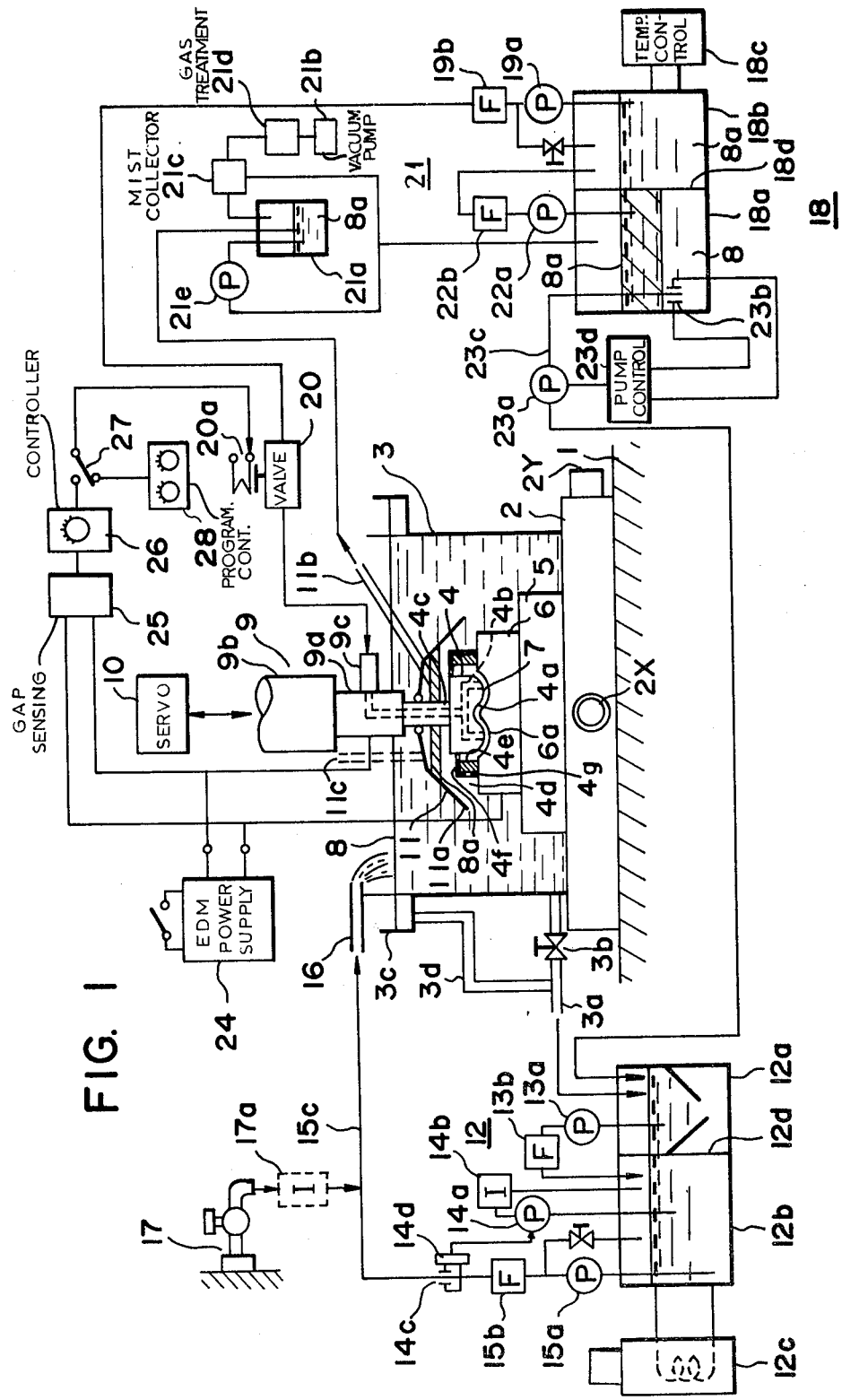
FIG. 1 is a view partly in section and partly in schematic form illustrating an embodiment of the present invention as applied to a sinking-type EDM process.

Referring now to FIG. 1 there is shown an apparatus embodying the principles of the present invention as applied to a boring- or sinking-type EDM machine which includes a bed 1 and a cross-table 2 mounted to be slidably movable thereon. The cross-table 2 has a worktank 3 securely mounted thereon and is displaceable in an X-Y or horizontal plane by means of an X-axis drive motor 2x and a Y-axis drive motor 2y. Typicaly, these motors are controlledly driven by a sequence-controller or numerical-control (NC) unit (not shown) for establishing an EDM position, or two- or three-dimensional contouring EDM purposes. Where three-dimensional cavity-sinking is to be performed as with a formed tool electrode 4 as illustrated, such a control unit only need be prepared to assume a point-to-point positioning function to establish the position of a workpiece in the X-Y plane relative to the axis of the tool electrode 4.

Disposed and fixed in position in the worktank 3 is a worktable 5 which carries a workpiece 6 thereon. The workpiece 6 is positioned in spaced juxtaposition with the tool electrode 4 to define a small machining gap 7 which is shown between a formed machining surface 4a of the tool electrode 4 and a surface 6a of the workpiece 6 being electroerosively machined therewith. The tool electrode 4 is formed with fluid passages 4b therein which are open to the machining gap 7 at their respective one ends and which have a common inlet at their other ends. The fluid passages 4b are open out of the tool electrode 4 to the machining gap 7 primarily at relatively projecting or convex portions on the machining surface 4a or at locations around them. It is desirable that these openings of the fluid passages be distributed uniformly over the entire machining surface 4a of the tool electrode 4.

The worktank 3 is filled with a water machining liquid 8 to immerse therein the tool electrode 4, the workpiece 6 and the machining gap 7 defined therebetween. It is essential that the machining gap 7 be located sufficiently deep below the surface of the water machining liquid 8 in the worktank 3 and the water machining liquid 8 in the latter be held in contact with the workpiece 6 to keep it sufficiently cool during the electrical discharge machining operation.

The tool electrode 4 is securely supported by a shank 4c which is in turn detachably supported by a tool head 9. The tool head 9 has a holder 9a supporting the shank 4c and a ram 9b which carries the holder 9a. The tool holder 9a and the shunk 4c are bored for supply with a hydrocarbon liquid through an inlet 9c fitted to the holder 9a to deliver the hydrocarbon liquid through the passages 4b into the machining gap 7. The ram 9b is shown as extending coaxially with the tool holder 9a and the electrode shank 4c and is vertically movable by a servo-control unit 10 to displace the tool electrode 4 up and down along a Z-axis which is orthogonal to the X-Y plane.

Optionally, the lateral surface of the tool electrode 4 may be enclosed with a generally annular partition member 4d for limiting entry of the water liquid 8 into the machining gap 7, the member comprising a cylindrical porous body 4e composed of a rubber or synthetic resin or a porous metal or alloy coated with a resin and rubber. The body 4e is shown standing on the workpiece 6 and enclosed with a cup member 4f having a top opening through which the tool electrode 4 is slidably passed. The cup member 4f is formed with apertures 4g. The hydrocarbon liquid 8a injected into and passed away from the machining gap 7 is thus allowed to pass through the porous body 4e and then through the apertures 4g for diffusion into the water liquid 8. The cup member 4f is, preferably, composed of a permanent magnetic material so as to be capable of magnetic attachment to the ferrous workpiece 6.

Disposed to overlie the tool electrode 4 and the workpiece 6 is a covering 11 in the form of a downwardly open box or umbrella to capture the hydrocarbon liquid floating through the water liquid from the machining gap 7. The covering 11 is supported fittedly through its central opening with the shank 4c and should be of a size sufficient to extend over the machining gap 7 and to thoroughly catch the floating hydrocarbon liquid. The covering may be positioned to immerse it in its entirety in the water liquid 8 retained in the worktank 3. At the commencement of an EDM operation, at least the periphery 11a of the covering at its lower end need be immersed in the water liquid 8. The covering 11 is provided at a portion of its top with a drain conduit 11b for drawing the hydrocarbon liquid 8a floating from the machining gap 7 and collected beneath the covering 11, together with a portion of the water liquid 8. The hydrocarbon liquid 8a recovered from the machining gap 7 is thus effectively prevented from overaccumulation in the covering 11 and flowing out thereof. The covering 11 may also be provided at another portion of its top with a gap removal duct 11c for drawing under suction gases which are produced by decomposition of hydrocarbon and water in the EDM gap 7 and collected with the covering 11.

The worktank 3 is provided with a drain pipe 3a which is led to a first liquid treatment system 12. A valve 3b is provided in the pipe 3a. The worktank 3 has its top rim 3c projected outwards for accepting the overflowing water liquid and permitting it to flow by gravity through a pipe 3d into the drain pipe 3a.

The first liquid treatment system 12 includes a sedimentation tank 12a for receiving the used water liquid 8 from the drain pipe 3a to allow sludge in the received liquid to be sedimented generally by gravity therein. A clearer upper layer of the water liquid in the sedimentation tank 12a is drawn by a pump 13a and passed through a filter 13b for reception in a purified water tank 12b. The latter is equipped with a temperature control (cooling and/or heating) unit 12c for maintaining the purified water liquid in the tank 12b at a predetermined temperature. The water liquid in the tank 12b is recycled by a pump 14a through an ion-exchanger cartridge 14b to control its specific conductivity or resistivity. The conductivity-adjusted water liquid is drawn from the tank 12b by a pump 15a and is thereby fed through an ultra-fine filter 15b into the worktank 3 via an inlet conduit 16 disposed at a top portion of the worktank 3. A conductivity (resistivity) detecting sensor 14c is provided between the filter 15b and the inlet conduit 16 and is connected to a control circuit 14d which is designed to control the operation of the pump 14a, thereby maintaining the specific conductivity or resistivity at a predetermined value in excess of $10^3$ ohm-cm. When a deviation of the conductivity or resistivity from such a preset value is detected by the sensor 14c, the control circuit 14d is operated to actuate the pump 14a (which has been deactuated) to circulate the water liquid in the tank 12b through the ion-exchanger cartridge 14b until the preset conductivity or resistivity of the water liquid is restored.

To the purified water flowing through the water delivery conduit 15c between the ultra-fine filter 15b and the inlet 16 to the tank 3 there may be added a municipal water liquid supplied by a tap 17. Optionally, a further ion-exchange cartridge 17a may be provided between the tap 17 and the water delivery conduit 15c.

In this manner, the worktank 3 is replenished with the refreshed water liquid having a desired conductivity and resistivity, which should be in excess of $10^3$ ohm-cm. Alternatively, the municipal water liquid from the tap 17 may, with or without deionization by the further ion-exchange cartridge 17a, be added to the tank 12b or 12a. The tanks 12a and 12b may as shown be two reservoirs separated by a partition 12d in a single tank unit which is cooled and/or heated by the temperature control unit 12c to maintain the liquids in both reservoirs at an equal predetermined temperature.

The machining liquid 8a collected with and immediately under the covering 11 is led into a second liquid treatment system 18. This system is shown as constituted by a single tank comprising two reservoirs 18a and 18b separated by a partition 18d therein. The reservoir 18a is designed to receive the contaminated machining liquid 8a and to separate it into a water component 8, a hydrocarbon liquid component 8a and machining products, the latter being sedimented generally by gravity towards the bottom of the reservoir 18a. As shown, the hydrocarbon component 8a because of a lower specific gravity is floating on the water liquid 8 to form the upper layer in the reservoir 18a. The water liquid constituting the lower liquid layer in the reservoir 18a is drawn by a pump 23a into the sedimentation reservoir 12a in the first liquid-treatment system described. A water sensor 23b which embodies a liquid conductivity or resistivity sensor is disposed in the reservoir 18a to detect the presence of the water liquid in the region of an opening of the conduit 23a leading from the pump 23a in the reservoir 18a and is connected to a control circuit 23d associated with the pump 23a. Thus, the pump 23a continues to draw the water liquid 8 into the first liquid-treatment system 12 as long as the sensor 23b detects the water liquid 8. In this manner, a pump 23a is assured against drawing the hydrocarbon liquid 8a in the reservoir 18a into the first liquid-treatment system 12.

The floating hydrocarbon liquid 8a in the reservoir 18a is drawn by a pump 22a into the second reservoir 18b via a filter 22b. The second reservoir 18b thus recovers a purified hydrocarbon liquid 8a which is drawn by a pump 19a and is thereby fed through an ultra-fine filter 19b and an electro-magnetically controlled valve 20 into the machining gap 7 in the worktank 3 via the inlet 9c to the tool electrode 4. The reservoirs 18a and 18b are cooled and/or heated by a temperature control unit 18c.

The hydrocarbon liquid 8a flushed into the machining gap 7 via the passage 4b serves as an electrical discharge machining medium and then, entrained with the machining products in the gap 7 and with an amount of the water liquid 8 in the worktank 3, floats onto the region immediately below the covering 11. As has been described, the contaminated hydrocarbon liquid collected in this manner with the covering 11 is drawn via the outlet 11b into the second liquid-treatment system 18. In the arrangement shown, this contaminated hydrocarbon liquid is drawn by a suction system 21 which includes a tightly sealed receptacle 21a in which the liquid is accepted. The space above the liquid 8a in the receptable 21a is evacuated by a vacuum pump or negative pressure means 21b. Mists and gases from the machining liquid 8a in the space within the receptacle 21a are collected and treated by a mist collector 21c and a gas-treatment unit 21d provided between the receptacle 21a and the negative-pressure source 21b. The machining liquid 8a in the receptacle 21a is drawn by a pump 21e and is led, together with the liquid component separated by the mist collector 21c, into the reservoir 18a in the second liquid-treatment system 18.

An EDM power supply 24 has one output terminal electrically connected to the tool electrode 4 via the conductive tool holder 9a and the conductive electrode shank 4c and the other output terminal electrically connected to the workpiece 6. The power supply 24 may be of any conventional design to supply a train of electrical voltage pulses across the machining gap 7 between the tool electrode 4 and the workpiece 6. These voltage pulses result in a succession of electrical discharges through the gap 7, thereby electroerosively removing material from the workpiece 6.

Connected also to the machining gap 7 is a gap sensing circuit 25 designed to detect one or more electrical gap variables, e.g. gap voltage and/or current, on a per-pulse basis or on an average basis over a number of machining pulses, to monitor the gap state in the EDM operation. For example, an average gap or discharge voltage and/or current, or a peak discharge current or voltage, or an average discharge current or voltage during each individual pulse, or a high-frequency current or voltage component during each discharge pulse may be detected by the gap sensing circuit 25 and may be compared with one or more reference values preset therein. The output signal of the gap sensing circuit 25 is applied to a control circuit 26 connected via a switch 27 to the energization circuit 20a of the electromagnetic valve 20 to selectively open and close the valve 20 or to control the opening of the valve 20. The switch 27 is closed by a program controller 28.

With the valve 20 opened, it will be apparent that the hydrocarbon liquid 8a is forced via the inlet 9c into the machining gap 7 to flood essentially or almost the entire area thereof defined between the tool electrode 4 and the workpiece 6. The hydrocarbon liquid 8a such as kerosene away from the machining gap 7 tends, owing to its lower specific gravity, to float on the water liquid 8 retained in the worktank 3 and is eventually trapped by the covering 11 and drawn through the outlet 11b.

On the other hand, the tool electrode 4 and the workpiece 6 along almost all their surface areas except defining the machining gap 7 are held in contact with the water liquid 8 which is higher in thermal conductivity and greater in heat capacity, hence higher in cooling ability than the hydrocarbon liquid 8a such as kerosene. The ability of the water liquid 8 to cool the tool electrode 4 and the workpiece 6 with greater effectiveness allows the off-time or pulse interval between successive voltage pulses to be much reduced and the frequency of these pulses or discharge repetition rate to be markedly increased, thereby increasing the removal rate or shortening the machining time. Furthermore, there is achieved a marked improvement in the relative electrode wear, i.e. the ratio in weight or volume of the wear of the tool electrode 4 to the amount of stock removed from the workpiece 6, as compared with the conventional method (which has heretofore been believed to yield the best result) in which the worktank (3) is filled with a hydrocarbon liquid such as kerosene whose temperature is maintained at 25° C. or so.

It has been found that hydrocarbon gases of 1000 cc are produced together with a minute amount of carbon in removing a ferrous material of 1 gram by electrical discharges and requires 1 cc of kerosene liquid. To achieve a removal rate of 1 gram per minute, it can be seen that the kerosene liquid 8a need be replenished into and through the machining gap 7 at a volume flow rate of 1 cc/minute. In view of the fact, however, that a portion of the hydrocarbon liquid 8a supplied into the gap 7 will, without undergoing the EDM action, be passed away from the gap 7, the minimum flow rate is practically deficient. It has been found that the use of a flow rate for the hydrocarbon liquid 8a at least five times as great as this minimum rate is required for satisfactory operation.

The electromagnetic valve 20 may be operated in any of various modes as shown in time charts (A)–(E) in FIG. 2 to deliver the hydrocarbon liquid 8a from the reservoir 18b into the machining gap 7 through the inlet conduit 9c. It can be seen that the chart (A) shows a constant delivery (Q) of the hydrocarbon liquid with respect to time. The chart (D) shows that the valve 20 is opened periodically with a predetermined open-time and a predetermined close-time to periodically flush the machining gap 7 with a predetermined amount of the hydrocarbon liquid 8a. In this case, the controller 28 is designed to provide a succession of signal pulses and connected via the switch 26 to the energizing circuit 20a for the electromagnetic valve 20 to periodically open it. The control circuit 26 remains disconnected from the energization circuit 20a. The chart (B) shows that the valve 20 is held open to secure a minimum constant flow of the hydrocarbon liquid delivered into the machining gap 7 and the opening of the valve 20 is periodically enlarged to periodically increase the delivery flow. The controller 28 continuously connected to the energization circuit 20a via the switch 27 provides a constant energization signal on which a succession of signal pulses is superimposed. The time chart (E) shows that the control circuit 26 operating in response to the EDM gap sensor 25 is connected to the energization circuit 20a for the electromagnetic valve 20 while the controller 28 remains disconnected therefrom. It is shown that the valve 20 is opened aperiodically with a predetermined open-time and the close-time which varies as a function of the gap state. The chart C shows that the valve 20 is held open in response to a continuous signal furnished by the controller 28 to secure a minimum constant flow delivery and the opening of the valve 20 is intermittently enlarged to intermittently increase the flow delivery in response to output signals of the control circuit 26 responding through the sensor 25 to the gap state. The switch 27 keeps the control circuit 27 and the controller 28 connected to the energization circuit 20a. It will be understood that various combinations of the different modes of delivery of the hydrocarbon liquid shown in FIGS. 2(A)–2(E) and described are also possible.

The principles of the present invention are also applicable to a traveling-wire type EDM arrangement in which a continuous wire electrode is axially displaced vertically traversing a workpiece disposed between a pair of wire-guide members. In embodying the invention, for example, the workpiece is immersed in a water liquid (8) retained in a worktank and two nozzles disposed respectively on the upper and lower sides of the workpiece are supplied with a hydrocarbon liquid (8a) for injection into the machining gap. A covering (11) may be arranged to depend from an arm on which the upper wire guide member is mounted.

FIG. 3 shows another embodiment of the invention as applied to a traveling-wire type EDM machine. As is conventional, a continuous wire electrode 4w is axially transported to vertically traverse a workpiece 6 which is mounted on a worktable 5. The machine includes an upper arm 29 disposed above the workpiece 6 and having a brake unit 30, a guide roller 31 and an upper wire-positioning guide member 32 mounted thereon and a lower arm 33 disposed below the workpiece 6 and having a lower wire-positioning guide member 34, a capstan and pinch roller unit 35 and a guide roller 36 mounted thereon. Thus, the wire electrode 4w from a supply (not shown) is axially driven by the capstan and pinch roller unit 35 and under a braking force exerted by the brake roller 30 and is axially transported via the guide roller 31, the upper wire-positioning guide member 32, the workpiece 6, the lower wire-positioning guide member 34 and the guide roller 36, and is eventually taken up by a collection means (not shown).

In addition, the machine is provided, in accordance with the present invention, with two coaxial nozzle units 37 and 38 which are disposed between the upper wire-positioning guide member 32 and the workpiece 6 and between the latter and the lower wire-positioning guide member 34, respectively. The upper nozzle unit 37 open to the upper surface of the workpiece 6 and coaxial with the wire electrode 4w comprises a first nozzle 39 having a nozzle opening 39a of a greater cross-section and a second nozzle 40 having a nozzle opening 40a of a smaller cross-section coaxial with and projected from the nozzle opening 39a of the first nozzle 39. The lower nozzle unit 38 open to the lower surface of the workpiece 6 and coaxial with the wire electrode 4w comprises a first nozzle 41 having a nozzle opening 41a which may be the same in cross-section as the nozzle opening 39a and a second nozzle 42 having a smaller nozzle opening 42a coaxial with and projected from the larger nozzle opening 41a. The nozzle opening 42a of the lower second nozzle 42 is coaxial with and the same in cross section as the nozzle opening 40a of the upper second nozzle 40. The upper and lower nozzle units 37 and 38 are fixed in position relative to the upper and lower arms 29 and 33 (namely the upper and lower wire-positioning guide members 32 and 34) so that as the workpiece 6 is displaced during the machining operation, they are held in position to maintain the coaxiality of their respective two nozzle openings 39a, 40a and 41a, 42a with the wire electrode 4w engaged in the EDM erosion of the workpiece 6 across the machining gap 7. Electrical brushes 43 and 44 are shown disposed in contact with the traveling wire electrode 4w within the upper and lower larger nozzles 39 and 41, respectively, and are electrically connected commonly to one output terminal of an EDM power supply 24 whose other output terminal is electrically connected to the workpiece 6.

In accordance with a feature of the present invention, the upper and lower larger nozzles 39 and 41 are fed with a water liquid 8 while the upper and lower smaller nozzles 40 and 42 are fed with a hydrocarbon liquid 8a. As a result, the hydrocarbon liquid 8a is fed coaxially with the traveling wire electrode 4w and delivered into the machining gap 7 from the upper and lower smaller nozzles 40 and 42 closer to the workpiece 6. The water liquid 8 is fed coaxially with the stream of the hydrocarbon liquid 8a while serving as an envelop flow therefor from the upper and lower larger nozzles 39 and 41 and tends to flow over the upper and lower surfaces of the workpiece 6 and behind the advancing wire electrode 4w and the machining gap 7 therein. Electrical discharges are thus created at least predominantly through the hydrocarbon liquid 8a in the machining gap 7 while a portion of the workpiece 6 surrounding the machining gap is immersed in and flooded with the water liquid 8 and thereby kept sufficiently cool. The hydrocarbon and the water liquid 8 and 8a delivered to the workpiece areas are eventually collected by a pan 45 and drained through an opening 45a therein and may then be fed into a liquid separation system 18 as shown in and described in connection with FIG. 1. Since regions of electrical discharges, which are effected through the inflammable hydrocarbon liquid, are kept enclosed with a sufficient amount of the non-inflammable water liquid, there is practically no danger of fire.

What is claimed is:

1. A method of machining a workpiece by electroerosion wherein a tool electrode is spacedly juxtaposed with the workpiece across a machining gap and a succession of electrical pulses are applied across the machining gap filled with a machining liquid to effect time-spaced electrical discharges between the tool electrode and the workpiece through the machining gap, the method comprising the steps of:
   (a) immersing the machining gap in a water liquid to surround and enclose said gap therewith, substantially in the absence of a hydrocarbon liquid surrounding said gap;
   (b) injecting the hydrocarbon liquid in a forced flow under an external pressure into said machining gap immersed in, surrounding by, and enclosed with, said water liquid; and thereafter
   (c) initiating the electrical discharges through the machining liquid at least predominantly constituted with said injected hydrocarbon liquid.

2. The method defined in claim 1 wherein step (a) is established by immersing said workpiece completely and at least that portion of said tool electrode which is juxtaposed therewith in said water liquid which is retained as a relative static mass thereof in a worktank.

3. The method defined in claim 2 wherein said hydrocarbon liquid injected in said forced flow under the external pressure into said machining gap is allowed, upon undergoing the electrical discharges therein, to diffuse into said relative static mass of water liquid surrounding said machining gap to float onto said water liquid.

4. The method defined in claim 3 wherein step (b) is carried out by injecting said hydrocarbon liquid into said machining gap through at least one passage formed in said tool electrode.

5. A method of electroerosively machining a workpiece juxtaposed with a tool electrode across a machining gap, comprising the steps of:
   (a) immersing the workpiece and at least that portion of the tool electrode which is juxtaposed therewith in a relative static mass of water retained in a worktank to enclose the machining gap with the water and locate the gap sufficiently deep below the surface of said static mass of water;
   (b) injecting through at least one bore formed in said tool electrode, a hydrocarbon liquid in a forced flow under an external pressure into said machining gap enclosed with said mass of water; and
   (c) effecting a succession of electrical discharges between the tool electrode and the workpiece across the machining gap flushed with said forced flow of hydrocarbon liquid to remove material from the workpiece while permitting the injected hydrocarbon liquid to be at least partly decomposed by the electrical discharges in the gap and then to diffuse through the enclosing water and float on said surface of mass thereof; and (d) continuing steps (b) and (c) while advancing said tool electrode vertically downwards into said workpiece.

6. A method of electroerosively machining a workpiece juxtaposed with a tool electrode across a machining gap, comprising the steps of:

directing at least one narrow stream of a hydrocarbon liquid selectively into the machining gap;

directing a flow of water towards the workpiece so as to form an envelope flow for said at least one narrow stream of hydrocarbon liquid;

regulating said stream of hydrocarbon liquid so as to force said water flow substantially not to enter said machining gap and to spread substantially over a portion of said workpiece which surrounds said machining gap; and effecting a succession of electrical discharges across the machining gap traversed by said hydrocarbon liquid.

7. The method defined in claim 4 or claim 5, further comprising the step of collecting under a negative pressure said hydrocarbon liquid from said gap floating on said water liquid.

8. The method defined in claim 4 or claim 5 wherein in step (b) said hydrocarbon liquid is continuously injected into the machining gap.

9. The method defined in claim 8 wherein the volume flow of said hydrocarbon liquid continuously injected into said machining gap is intermittently increased.

10. The method defined in claim 4 or claim 5 wherein in step (b) said hydrocarbon liquid is intermittently injected into said machining gap.

11. The method defined in claim 4 or claim 5, further comprising the steps of sensing the state of said machining gap to provide a control signal and, in response to said control signal, controlling the flow of said hydrocarbon liquid into said machining gap.

12. The method defined in claim 1 wherein step (b) comprises directing at least one narrow stream of said hydrocarbon liquid selectively into said machining gap and step (a) comprises directing a flow of said water liquid towards said workpiece to serve as an envelope flow for said narrow stream and permitting said water liquid flow to be forced by said hydrocarbon stream substantially not to enter said machining gap and then to spread over a portion of said workpiece surrounding said machining gap.

13. The method defined in claim 1, claim 12 or claim 5 wherein said water liquid has a specific resistance in excess of $10^3$ ohm-cm.

14. The method defined in claim 1, claim 12 or claim 5 wherein said hydrocarbon liquid comprises kerosene.

15. The method defined in claim 12 or claim 6 wherein said tool electrode is a continuous elongate electrode, further comprising the steps of continuously transporting said elongate electrode axially to traverse said workpiece, projecting said flow of water liquid from a first nozzle with an opening thereof adjacent to said workpiece and coaxial with said elongate electrode traversing said workpiece; and projecting said narrow stream of hydrocarbon liquid from a second nozzle coaxial with and smaller in cross section than said first nozzle and having an opening closer to said workpiece than the opening of said first nozzle.

16. An apparatus for machining a workpiece by electroerosion, comprising:

a tool electrode adapted to be spacedly juxtaposed with said workpiece across a machining gap;

a power supply for applying a succession of electrical pulses across the machining gap filled with a machining liquid to effect time-spaced electrical discharges between the tool electrode and the workpiece through the machining gap;

means (a) for immersing the machine gap in a water liquid so as to surround and enclose said gap therewith, substantially in the absence of a hydrocarbon liquid surrounding said gap; and means (b) for injecting the hydrocarbon liquid in a forced flow under an external pressure into the maching gap immersed in, and surrounded and enclosed with, said water liquid, said hydrocarbon liquid constituting at least a predominant portion of said machining liquid in said gap.

17. The apparatus defined in claim 16 wherein said means (a) comprises a worktank for having said workpiece securely positioned therein and immersed in a relative static mass of said water liquid together with a portion of said tool electrode spacedly juxtaposed with said workpiece to form said machining gap therewith in said mass.

18. The apparatus defined in claim 17, further comprising a cover member adapted to be at least partly immersed in said mass of water liquid within said worktank for collecting therewith said hydrocarbon liquid diffused into said water liquid from said machining gap and floating on said water liquid and negative-pressure means for drawing said collected hydrocarbon liquid out of said cover member.

19. The apparatus defined in claim 17 or claim 18, further comprising partition means for substantially enclosing a lateral surface of said tool electrode to limit entry of said water liquid into said machining gap.

20. The apparatus defined in claim 19 wherein said partition means contains a permanent magnet capable of attachment to said workpiece by magnetic attraction.

* * * * *